US011795324B2

(12) United States Patent
Lee et al.

(10) Patent No.: US 11,795,324 B2
(45) Date of Patent: Oct. 24, 2023

(54) POLYPHENYLENE ETHER BISMALEIMIDE RESIN AND METHOD FOR MANUFACTURING THE SAME, AND RESIN COMPOSITION

(71) Applicant: NAN YA PLASTICS CORPORATION, Taipei (TW)

(72) Inventors: Cheng-Chung Lee, Taipei (TW); Chen Hua Wu, Taipei (TW); Yu Shiang Peng, Taipei (TW); Wei Ting Wei, Taipei (TW); Chien Fu Lin, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/512,705

(22) Filed: Oct. 28, 2021

(65) Prior Publication Data

US 2023/0072168 A1 Mar. 9, 2023

(30) Foreign Application Priority Data

Aug. 30, 2021 (TW) ................. 110131975

(51) Int. Cl.
*C08L 71/12* (2006.01)
*C08F 222/06* (2006.01)
*C08G 65/333* (2006.01)
*C08G 65/40* (2006.01)

(52) U.S. Cl.
CPC .......... *C08L 71/126* (2013.01); *C08F 222/06* (2013.01); *C08G 65/33324* (2013.01); *C08G 65/33341* (2013.01); *C08G 65/4093* (2013.01); *C08G 2650/04* (2013.01); *C08L 2203/20* (2013.01)

(58) Field of Classification Search
None
See application file for complete search history.

(56) References Cited

U.S. PATENT DOCUMENTS

| 3,839,287 A | * | 10/1974 | Kwiatkowski | ....... C08G 73/124 |
| | | | | 524/742 |
| 2009/0312519 A1 | * | 12/2009 | Uera | ...................... C08G 65/44 |
| | | | | 562/455 |
| 2021/0002480 A1 | * | 1/2021 | Toshimitsu | ............. B32B 15/14 |

FOREIGN PATENT DOCUMENTS

| CN | 112898561 | 6/2021 | |
| JP | S63255263 | 10/1988 | |
| JP | H01226872 | 9/1989 | |
| JP | H01238568 | 9/1989 | |
| JP | H06107629 | 4/1994 | |
| TW | 201004924 | 2/2010 | |
| WO | WO-2019131306 A1 * | 7/2019 | ............. B32B 15/08 |

OTHER PUBLICATIONS

"Search Report of Europe Counterpart Application", dated Apr. 13, 2022, p. 1-p. 8.
"Office Action of Japan Counterpart Application", dated Dec. 13, 2022, p. 1-p. 5.
"Office Action of Taiwan Counterpart Application", dated Jan. 7, 2023, p. 1-p. 5.

* cited by examiner

*Primary Examiner* — Christopher M Rodd
(74) *Attorney, Agent, or Firm* — JCIPRNET

(57) ABSTRACT

A polyphenylene ether bismaleimide resin, a method for manufacturing the same, and a resin composition are provided. The polyphenylene ether bismaleimide (PPE-BMI) resin is obtained by a condensation reaction with a maleic anhydride and a primary amine compound as reactants. The primary amine compound is a polyphenylene ether diamine.

13 Claims, 1 Drawing Sheet

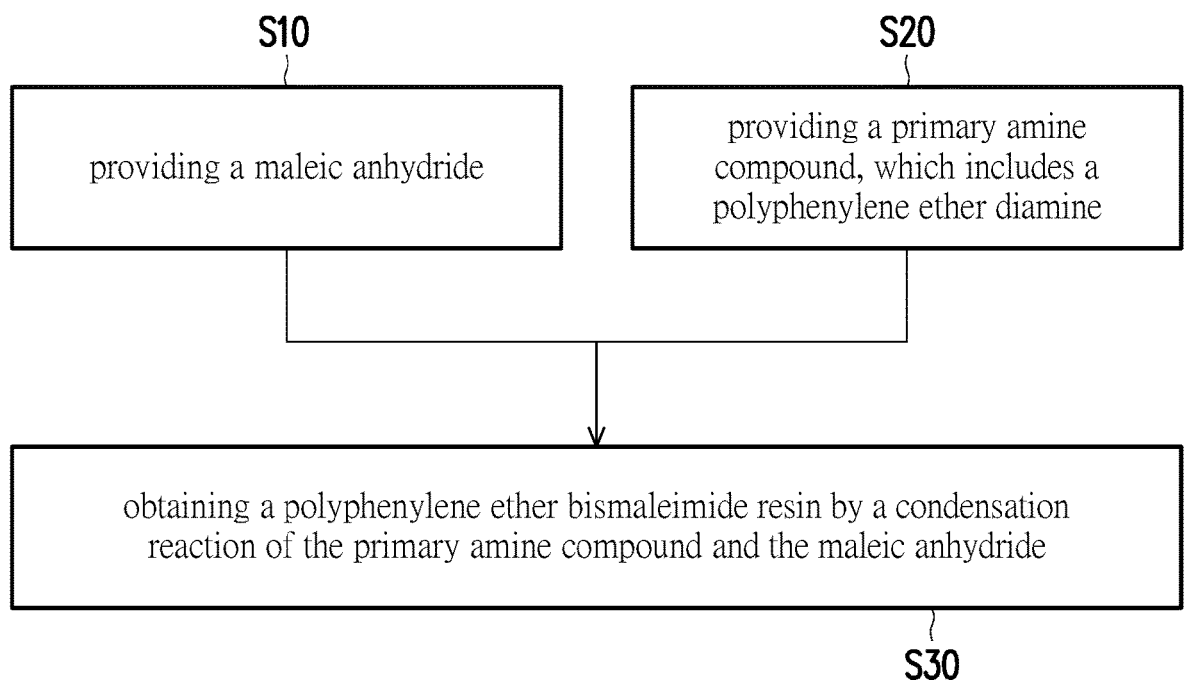

POLYPHENYLENE ETHER BISMALEIMIDE RESIN AND METHOD FOR MANUFACTURING THE SAME, AND RESIN COMPOSITION

CROSS-REFERENCE TO RELATED APPLICATION

This application claims the priority benefit of Taiwan application serial no. 110131975, filed on Aug. 30, 2021. The entirety of the above-mentioned patent application is hereby incorporated by reference herein and made a part of this specification.

BACKGROUND

Technical Field

The disclosure relates to a polyphenylene ether bismaleimide resin, a method for manufacturing the same, and a resin composition, and more particularly to a polyphenylene ether bismaleimide resin with good dielectric properties and heat resistance, a method for manufacturing the same, and a resin composition.

Description of Related Art

With technological advances, electronic components are developed towards a goal of being light, thin, and compact. In addition, the advent of the fifth generation mobile network technology (5G) has continuously increased the industrial demand for high-frequency transmission, high-speed signal transmission, and low latency. Therefore, related fields currently delve into research and development of substrate materials with high glass transition temperature (Tg), low dielectric constant ($D_k$), low dissipation factor ($D_f$), and good heat resistance to meet requirements of electronic substrates for dielectric properties (low dielectric constant and low dissipation factor) and heat resistance.

Although common substrate materials such as polyphenylene ether resins or cyanate resins have good dielectric properties, relatively high reactivity and fast reaction rate render these types of resins difficult to determine a gel point, resulting in the disadvantage of poor workability.

Generally, bismaleimide resins (mostly aliphatic molecular structures) has good workability, but due to the poor dielectric properties thereof, the bismaleimide resins cannot be used in products having strict requirements of dissipation factor (dissipation factor lower than 0.0041) yet. For example, in the prior art, a bismaleimide resin including an aliphatic molecular structure is disclosed. However, although the dissipation factor of a printed circuit board made of this bismaleimide resin having the aliphatic molecular structure can reach 0.0041, it will greatly reduce the glass transition temperature of a substrate. Therefore, bismaleimide resins currently available on the market still need to improve electrical properties and thereby maintain high glass transition temperature to meet requirements of high-frequency printed circuit boards.

SUMMARY

The disclosure provides a polyphenylene ether bismaleimide resin and a method for manufacturing the same, a resin composition formed by which has good heat resistance and dielectric properties.

The polyphenylene ether bismaleimide resin of the disclosure is obtained by a condensation polymerization reaction with a primary amine compound and a maleic anhydride as reactants. The primary amine compound includes a polyphenylene ether diamine.

The method for manufacturing the bismaleimide resin of the disclosure includes the following steps. A maleic anhydride, a primary amine compound, and a solvent are mixed and undergone a condensation reaction at a temperature of 100 to 130° C. to obtain the polyphenylene ether bismaleimide resin, and the primary amine compound includes a polyphenylene ether diamine.

Based on the above, the polyphenylene ether bismaleimide resin of the disclosure is formed by the polyphenylene ether diamine. Therefore, the polyphenylene ether bismaleimide resin may have good heat resistance and dielectric properties.

The disclosure further provides a resin composition formed by the foregoing polyphenylene ether bismaleimide resin, which has good heat resistance and dielectric properties.

The resin composition of the disclosure includes the foregoing polyphenylene ether bismaleimide resin, a triallyl isocyanurate, and a bismaleimide resin. Based on the total weight of the polyphenylene ether bismaleimide resin, the triallyl isocyanurate, and the bismaleimide resin being 100 parts by weight, the content of the bismaleimide resin is 20 to 40 parts by weight.

Based on the above, the resin composition of the disclosure includes the polyphenylene ether bismaleimide resin of the disclosure. Therefore, the resin composition may also have good heat resistance and dielectric properties.

BRIEF DESCRIPTION OF THE DRAWINGS

The FIGURE is a schematic partial flow chart of a method for manufacturing a polyphenylene ether bismaleimide resin according to an embodiment of the disclosure.

DESCRIPTION OF THE EMBODIMENTS

In the following detailed description, for purposes of explanation and not limitation, exemplary embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention.

Ranges may be expressed herein as from "about" one particular value to "about" another particular value, and may also be directly expressed as one particular value and/or to another particular value. When such a range is expressed, another embodiment includes from the one particular value and/or to the other particular value. Similarly, when values are expressed as approximations, by use of the antecedent "about", it will be understood that the particular value forms another embodiment. It will be further understood that the endpoints of each of the ranges are significant both in relation to the other endpoint, and independently of the other endpoint.

Herein, non-limiting terms (such as may, can, for example, or other similar terms) are non-essential or optional implementations, inclusions, additions, or existences.

Unless otherwise defined, all terms (including technical and scientific terms) used herein have the same meaning as commonly understood by one of ordinary skill in the art to which the disclosure belongs. It will be further understood that terms (such as those defined in commonly used dictionaries) should be interpreted as having a meaning that is consistent with their meaning in the context of the relevant art and will not be interpreted in an idealized or overly formal sense unless expressly so defined herein.

[Manufacturing Bismaleimide Resin]

As shown in The FIGURE, in this embodiment, a method for manufacturing a polyphenylene ether bismaleimide (PPE-BMI) resin may include the following steps.

First, a primary amine compound and a solvent are mixed at a temperature of 60 to 100° C. to form a raw material mixture.

In an embodiment, the ratio of the primary amine compound in the raw material mixture is about 30 wt % to 60 wt %.

In an embodiment, the solvent is selected from the group consisting of toluene, methyl isobutyl ketone (MIBK), methyl ethyl ketone (MEK), dimethylacetamide (DMAC), dimethylformamide (DMF), and proprylene glycol monomethyl ether (PM). However, the disclosure is not limited to the above examples.

In an embodiment, a catalyst may be added to the raw material mixture. The catalyst is selected from the group consisting of: methanesulfonic acid (MSA), oxalic acid, and p-toluenesulfonic acid (p-TSA). However, the disclosure is not limited to the above examples. In an embodiment, the ratio of the catalyst added in the raw material mixture is about 7 wt % to 10 wt %.

embodiment, the ratio of the foregoing molar numbers may have a better reaction yield (for example, a lower side reaction yield) and/or a better reagent (for example but not limited to, a reaction reagent or a neutralization reagent) usage rate. For example, if the ratio of the maleic anhydride is too high, in subsequent treatments (for example but not limited to, product extraction, waste liquid treatment), more alkali (for example but not limited to, sodium bicarbonate) needs to be added for acid-alkali neutralization.

In an embodiment, the polyphenylene ether bismaleimide resin obtained by the foregoing method may be measured by a gel permeation chromatograph (GPC) for its weight-average molecular weight (Mw). In addition, the weight-average molecular weight of the foregoing polyphenylene ether bismaleimide resin is 2800 to 4500 g/mol. The gel permeation chromatograph performs calibration based on a polystyrene (PS) of standard molecular weight, sets a flow rate of 1.0 ml/min, and uses a tetrahydrofuran (THF) as a mobile phase.

If the weight-average molecular weight of the polyphenylene ether bismaleimide resin is higher than 5000 g/mol, the corresponding polyphenylene ether bismaleimide resin may be less likely to be mixed with other resins to form a resin composition and thus may not be easily operated.

If the weight-average molecular weight of the polyphenylene ether bismaleimide resin is lower than 2000 g/mol, the corresponding polyphenylene ether bismaleimide resin may have relatively lower solubility and easily cause resin precipitation.

The structural formula of the polyphenylene ether bismaleimide resin formed by the foregoing method may be represented by the following [Formula 1].

[Formula 1]

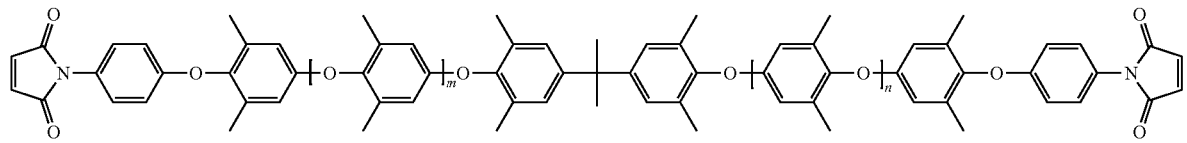

Next, a maleic anhydride is added to the raw material mixture. The maleic anhydride may undergo a condensation reaction with the primary amine compound to obtain the polyphenylene ether bismaleimide resin of this embodiment. Usually, the molar number of the maleic anhydride added is 1 to 3 times the molar number of total amine groups of the primary amine compound. The maleic anhydride may be a maleic anhydride solution with a concentration of 30 wt % to 40 wt %.

In an embodiment, the foregoing condensation reaction may last for 5 to 8 hours at a temperature of 90 to 130° C.

In the foregoing condensation reaction, if the molar number of the maleic anhydride added is less than 1 time the molar number of total amine groups of the primary amine compound, the weight-average molecular weight of the obtained polyphenylene ether bismaleimide resin may be too high, which may result in the weight-average molecular weight of the obtained polyphenylene ether bismaleimide resin higher than 7000 g/mol. However, the disclosure is not limited to the effects caused by the foregoing conditions and/or the conditions that cause the foregoing results.

In an embodiment, preferably, the molar number of the maleic anhydride added is 1.2 to 2.5 times the molar number of total amine groups of the primary amine compound. In an In [Formula 1], each of m and n is an integer greater than or equal to 9 and less than 16.

In this embodiment, the polyphenylene ether bismaleimide resin formed by the foregoing method has a high ratio of a polyphenylene ether structure. Therefore, the polyphenylene ether bismaleimide resin may have lower water absorption and higher structural symmetry. Hence, the polyphenylene ether bismaleimide resin may have a lower dielectric constant ($D_k$) and/or a lower dissipation factor ($D_f$). In an embodiment, with electromagnetic waves at a frequency of about 3 GHz, the dielectric constant to which the polyphenylene ether bismaleimide resin corresponds is about 3.5 to 4.1, and/or the dissipation factor to which the polyphenylene ether bismaleimide resin corresponds is about 0.0030 to 0.0050.

In addition, if the polyphenylene ether bismaleimide resin formed by the foregoing method is used for producing a copper foil substrate, the formed copper foil substrate may have higher delamination strength, higher glass transition temperature (Tg), lower dielectric constant ($D_k$), and/or lower dissipation factor ($D_f$). Therefore, the copper foil substrate may be applied to a printed circuit board for high-speed and/or high-frequency transmission.

EXAMPLES AND COMPARATIVE EXAMPLES

Hereinafter, examples and comparative examples are provided to specifically describe the disclosure, but the disclosure is not limited to the following examples.

The method of synthesis of polyphenylene ether amine compounds is described in detail as follows.

Steps: in a 1 L four-neck glass reaction vessel flask equipped with a temperature controller, a heating pack, an electric pug mill, and a condenser, reactants including about 100 g (or about 0.06 mol) of a polyphenylene ether structure compound as shown in [Compound 1], about 26.2 g (or about 0.19 mol) of 4-fluoronitrobenzene, and about 25.7 g (or about 0.19 mol) of potassium carbonate are put into a reaction tank to be fully dissolved by about 500 g of DMAC solvent at about 60 to 100° C., reacting at about 60 to 100° C. for about 10 to 24 hours. After the reaction is completed, purification is performed with methanol and water in a 1:1 ratio. After the solvent is removed, a compound shown in [Compound 2] may be obtained. About 100 g (or about 0.06 mol) of [Compound 2] and about 0.4 g of Pd/C are put into the reaction tank, the reactants are fully dissolved by about 500 g of DMAC solvent at about 60 to 100° C. for reacting at hydrogen stress of about 18 kg/cm$^2$ and at about 60 to 100° C. for about 10 to 24 hours. After the reaction is completed, purification is performed with methanol and water in a 1:1 volume ratio. After the solvent is removed, a compound shown in [Compound 3] may be obtained.

The foregoing [Compound 1], [Compound 2], and [Compound 3] are as follows.

toluene and about 19 g of dimethylacetamide (DMAC) at about 60° C. After the temperature rises to about 113° C. and makes the solvent refluxed, about 234 g of [Compound 3] polyphenylene ether amine compound solution (solid content of about 46 to 50% with a solvent of dimethylacetamide) is dripped with a peristaltic pump for about 3 hours to perform a condensation reaction. During dripping, circulating dehydration and heating are performed. As the dripping is completed, the temperature rises to about 100 to 120° C., and the temperature is maintained at about 100 to 120° C. for about 2 hours to make moisture completely removed. After neutralizing the system to pH=7±0.5 with sodium bicarbonate, the solvent is removed, and the polyphenylene ether bismaleimide (PPE-BMI) resin of the disclosure may be obtained.

The method for manufacturing a copper foil substrate is described in detail as follows.

Example 1

The foregoing polyphenylene ether bismaleimide resin and other commercially available resins were mixed into a resin varnish composition in the ratio of formula composition shown in [Table 1], and a copper foil substrate was prepared by a conventional method. The foregoing conventional method for preparing a copper foil substrate might be: impregnating 2116 fiberglass cloth with the resin varnish composition before drying at about 170° C. (temperature of the impregnation machine) for several minutes, and obtaining dried prepreg having the melt viscosity of about 4000 to The structural formula of [Compound 1]

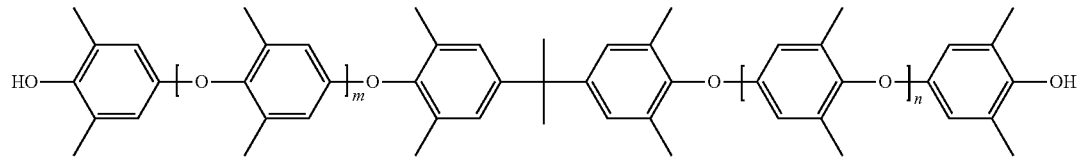

The structural formula of [Compound 2]

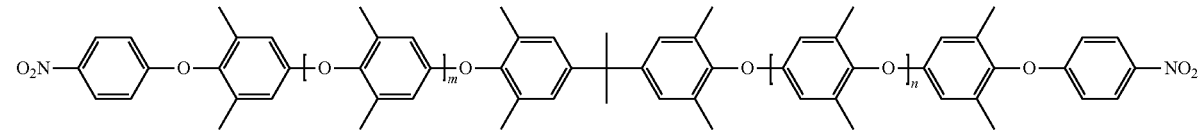

[0042]

The structural formula of [Compound 3]

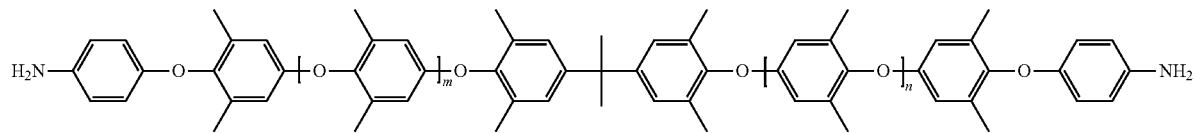

In the foregoing [Compound 1], [Compound 2], and [Compound 3], the definitions of m and n are the same as in [Formula 1].

The method of synthesis of the polyphenylene ether bismaleimide resin is described in detail as follows.

Steps: in a 2 L four-neck glass reaction vessel flask equipped with a temperature controller, a heating pack, an electric pug mill, and a condenser, about 47.1 g of maleic anhydride (MA) as a reactant and about 28 g of p-toluenesulfonic acid as a catalyst are put into the reaction tank, and the reactant is fully dissolved by a solvent of about 170 g of 12000 poise by adjusting and controlling the drying time. Next, four pieces of prepreg were put layer by layer between two pieces of about 35 μm thick copper foil to perform a pressing step (to be described in detail later), and the copper foil substrate shown in [Example 1] in [Table 1] might thus be formed.

Examples of Conditions/Processes for the Pressing Step are as Follows:

Step 1: the temperature was increased from about 80° C. to about 195° C. within 0.5 hours (recorded as: 85↑ 195° C., 0.5 hr).

Step 2: the stress was increased from about 7 kg/cm² to about 25 kg/cm² within 0.5 hours (recorded as: 77↑ 25 kg/cm², 0.5 hr).

Step 3: pressing was performed for 2.0 hours at a temperature of about 195° C. and a stress of about 25 kg/cm² (recorded as: 195° C./25 kg/cm², 2.0 hr).

Example 2 to Example 3

Corresponding copper foil substrates were formed by the same or similar method as [Example 1] and were different in the ratio of components in the resin varnish composition (as shown in [Table 1]).

Comparative Example 1 to Comparative Example 3

Corresponding copper foil substrates were formed by the same or similar method as [Example 1] and were different in not using the bismaleimide resin having the polyphenylene ether structure of the disclosure but instead using a common resin generally used to produce copper foil substrates (such as the resin with the model number of SA-9000 by SABIC) as a comparative example. In addition, the ratio of each component in the resin varnish composition used is shown in [Table 1]. In addition, the bismaleimide resin (non-polyphenylene ether type) used might include resins in BMI-2300 series and/or BMI-5100 series sold by DAIWA FINE CHEMICALS (TAIWAN) CO., LTD. In addition, the triallyl isocyanurate used may include polycyanurates in TAIC series sold by MITSUBISHI CHEMICAL.

copper-containing copper foil substrate into a 6.35 mm² square test piece and baking the test piece in an oven at about 105° C. for about 2 hours before placing the test piece on a test platform of the thermomechanical analyzer. After resetting to zero, the thermomechanical analyzer was heated at a rate of about 10° C./min to about 288° C. and maintained the temperature at 288±5° C. for recording the required time of test piece and copper foil substrate delamination.

Water absorption testing (pressure cooker testing for 2 hours) was performed by cutting the etched substrate into an about 5 cm×5 cm square test piece and baking the test piece in an oven at about 105° C. for about 2 hours before placing the test piece in a pressure cooker with a condition of about 2 atm×120° C. After about 120 minutes in the pressure cooker, the water absorption rate was recorded as the weight difference of the test piece before and after placed in the pressure cooker÷the initial weight of the test piece×100%.

Thermal expansion coefficient testing was performed by using a thermomechanical analyzer (TMA) with a heating rate of about 20° C./min.

Temperature of glass transition (Tg) testing was performed by using a differential scanning calorimeter (DSC) with a heating rate of about 20° C./min.

Dielectric constant testing was performed by cutting a copper foil substrate from which the copper foil had been removed into a 5 cm×5 cm square test piece and baking the test piece in an oven at about 105° C. for about 2 hours before measuring the thickness with a thickness gauge. Next, the test piece is clamped into an impedance analyzer

TABLE 1

| Item | Example 1 | Example 2 | Example 3 | Comparative Example 1 | Comparative Example 2 | Comparative Example 3 |
|---|---|---|---|---|---|---|
| resin 1: polyphenylene ether bismaleimide (PPE-BMI) resin | 20 | 30 | 40 | — | — | — |
| resin 2: SABIC SA-9000 | — | — | — | 30 | 40 | 50 |
| resin 3: BMI-2300 by DAIWA FINE CHEMICALS | 50 | 40 | 30 | 40 | 30 | 20 |
| resin 4: BMI-5100 by DAIWA FINE CHEMICALS | 20 | 20 | 20 | 20 | 20 | 20 |
| resin 5: TAIC by MITSUBISHI CHEMICAL | 10 | 10 | 10 | 10 | 10 | 10 |
| flame retardant: OP935 by CLARIANT | 20 | 20 | 20 | 20 | 20 | 20 |
| filling agent: 525ARI by SIBELCO | 40 | 40 | 40 | 40 | 40 | 40 |
| crosslinking accelerator: LuF | 2.5 | 2.5 | 2.5 | 2.5 | 2.5 | 2.5 |
| delamination strength (lb/in) | 4.46 | 4.64 | 4.98 | 4.16 | 4.43 | 4.78 |
| PCT 2 hr T288° C. (min) | >10 | >10 | >10 | >10 | >10 | >10 |
| T-288 (copper contained) heat resistance (min) | >60 | >60 | >60 | >60 | >60 | >60 |
| PCT 2 hr water absorption | 0.36 | 0.32 | 0.30 | 0.29 | 0.24 | 0.19 |
| thermal expansion coefficient ($\alpha1/\alpha2$) (ppm/° C.) | 32/171 | 33/178 | 35/183 | 32/196 | 33/219 | 31/253 |
| Tg (DSC, ° C.) | 221 | 213 | 205 | 197 | 189 | 176 |
| $D_k$ (3 GHz) | 4.04 | 4.03 | 4.01 | 4.04 | 4.02 | 3.97 |
| $D_f$ (3 GHz) | 0.00373 | 0.00369 | 0.00361 | 0.00351 | 0.00347 | 0.00340 |
| flame retardancy (UL-94) | V-0 | V-0 | V-0 | V-0 | V-0 | V-0 |

Delamination strength of samples was tested according to IPC-TM-650, Method 2.4.8.

PCT 2 hr T288° C. (i.e., solder heat resistance test at 288° C. after pressure cooker testing for 2 hours) was tested by immersing the test piece which had undergone pressure cooker testing in a soldering furnace at 288±5° C. for recording the required time for popcorn and delamination of the test piece.

T-288 heat resistance (copper contained) was analyzed with a thermomechanical analyzer and tested by cutting a (Agilent E4991A), and dielectric constant ($D_k$) data of three points are measured for an average value.

Dissipation factor testing was performed by cutting a copper foil substrate from which the copper foil had been removed into a 5 cm×5 cm square test piece and baking the test piece in an oven at about 105° C. for about 2 hours before measuring the thickness with a thickness gauge. Next, the test piece is clamped into an impedance analyzer (Agilent E4991A), and dissipation factor ($D_f$) data of three points are measured for an average value.

Molecular weight (Mw) was analyzed by a gel permeation chromatograph (GPC) and calibrated based on a polystyrene of standard molecular weight.

Flame retardancy testing of the sample was performed according to the UL-94 standard method.

According to the experimental results in [Table 1], in [Example 1] to [Example 3], as the PPE-BMI content increases from 20% to 40%, the delamination strength increases from 4.46 to 4.98 lb/in, $D_k$ decreases from 4.04 to 4.01, and $D_f$ decreases from 0.00369 to 0.00361.

Under the conditions of the same ratio, it is known from the experimental results of [Example 2] to [Example 3] and [Comparative Example 1]-[Comparative Example 2] upon comparison that when the PPE-BMI resin of the disclosure is used, the delamination strength, the thermal expansion coefficient, and the glass transition temperature properties all increase, with the rest being the same as using SA-9000 or being within the corresponding standard specifications.

INDUSTRIAL APPLICABILITY

In addition, the bismaleimide resin formed by the method for manufacturing the bismaleimide resin in the foregoing embodiment of the disclosure may be directly or indirectly applied to copper foil substrates, and may be further processed into other consumer electronics, industrial electronic products, or electronic products in suitable applications.

What is claimed is:

1. A method for manufacturing a polyphenylene ether bismaleimide resin, comprising:
   mixing a maleic anhydride, a primary amine compound, and a solvent, and performing a condensation reaction at a temperature of 100 to 130° C. to obtain the polyphenylene ether bismaleimide resin having a weight-average molecular weight of 2800 to 4500 g/mol, wherein the structural formula of the polyphenylene ether bismaleimide resin is:

[chemical structure]

wherein each of m and n is an integer greater than or equal to 9 and less than 16,
   wherein in the reactant, a molar number of the maleic anhydride is 1.2 to 2.5 times a molar number of total amine groups of the primary amine compound.

2. The method for manufacturing the polyphenylene ether bismaleimide according to claim 1, wherein a dielectric constant (3 GHz) of the polyphenylene ether bismaleimide resin is 3.5 to 4.1.

3. The method for manufacturing the polyphenylene ether bismaleimide according to claim 1, wherein a dissipation factor (3 GHz) of the polyphenylene ether bismaleimide resin is 0.0030 to 0.0050.

4. The method for manufacturing the polyphenylene ether bismaleimide according to claim 1, wherein a dielectric constant (3 GHz) of the polyphenylene ether bismaleimide resin is 3.5 to 4.1, and a dissipation factor (3 GHz) of the polyphenylene ether bismaleimide resin is 0.0030 to 0.0050.

5. The method for manufacturing the polyphenylene ether bismaleimide according to claim 1, wherein the primary amine compound comprises a polyphenylene ether diamine.

6. The method for manufacturing the polyphenylene ether bismaleimide according to claim 5, wherein the structural formula of the polyphenylene ether diamine is:

[chemical structure]

7. The method for manufacturing the polyphenylene ether bismaleimide according to claim 1, wherein the solvent is selected from a group consisting of toluene, methyl isobutyl ketone (MIBK), methyl ethyl ketone (MEK), dimethylacetamide (DMAC), dimethylformamide (DMF), and proprylene glycol monomethyl ether (PM).

8. The method for manufacturing the polyphenylene ether bismaleimide according to claim 7, wherein the solvent is selected from a group consisting of toluene and dimethylacetamide (DMAC).

9. The method for manufacturing the polyphenylene ether bismaleimide according to claim 1, further comprising:
   mixing the maleic anhydride, the primary amine compound, a catalyst, and the solvent, and performing the condensation reaction to obtain the polyphenylene ether bismaleimide resin.

10. The method for manufacturing the polyphenylene ether bismaleimide according to claim 9, wherein the catalyst is selected from a group consisting of methanesulfonic acid (MSA), oxalic acid, and p-toluenesulfonic acid (p-TSA).

11. The method for manufacturing the polyphenylene ether bismaleimide according to claim 10, wherein the catalyst comprises p-toluenesulfonic acid (p-TSA).

12. The method for manufacturing the polyphenylene ether bismaleimide according to claim 11, wherein a weight ratio of the catalyst in a mixture of the maleic anhydride, the primary amine compound, the catalyst, and the solvent is 7 wt % to 10 wt %.

13. The method for manufacturing the polyphenylene ether bismaleimide according to claim 1, wherein the condensation reaction lasts for 5 to 8 hours.

* * * * *